US012719564B2

(12) United States Patent
Mansour et al.

(10) Patent No.: US 12,719,564 B2
(45) Date of Patent: Aug. 25, 2026

(54) INTER SATELLITE COVERAGE MANAGEMENT

(71) Applicant: T-MOBILE INNOVATIONS LLC, Overland Park, KS (US)

(72) Inventors: Nagi A. Mansour, Arlington, VA (US); Akin Ozozlu, McLean, VA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 308 days.

(21) Appl. No.: 18/467,588

(22) Filed: Sep. 14, 2023

(65) Prior Publication Data

US 2025/0096886 A1 Mar. 20, 2025

(51) Int. Cl.

*H04B 7/185* (2006.01)
*H04B 17/309* (2015.01)
*H04W 36/00* (2009.01)

(52) U.S. Cl.

CPC ....... *H04B 7/18513* (2013.01); *H04B 17/309* (2015.01); *H04W 36/0085* (2018.08)

(58) Field of Classification Search

CPC .......................... H04B 7/18513; H04B 17/309; H04B 17/318; H04B 7/18502; H04B 7/185; H04B 7/15; H04B 7/18515; H04B 7/18523; H04B 7/18519; H04W 36/0085

See application file for complete search history.

(56) References Cited

U.S. PATENT DOCUMENTS

2023/0370154 A1* 11/2023 Ciochina ............ H04B 7/18539
2024/0032139 A1* 1/2024 Nuggehalli ....... H04W 52/0274

OTHER PUBLICATIONS (CN 116321333 A), Li et al., Communication Method, Device, Non-volatile Storage Medium and Electronic Device, Jun. 2023, pp. 1-17 (Year: 2023).*

(RU 2144732 C1),Kejt et al., Method for Switching Individual User Station From Current Cell to One of Multiple Possible Cells in Satellite Cellular Communication Network, Jan. 2000, pp. 1-10 (Year: 2000).*

* cited by examiner

*Primary Examiner* — Keith Ferguson
(74) *Attorney, Agent, or Firm* — SHOOK, HARDY & BACON L.L.P.

(57) ABSTRACT

Embodiments of the present disclosure are directed to systems and methods for improved management of extraterrestrial base stations' coverage areas. The system comprises one or more extraterrestrial base stations of a radio access network and one or more computer processing components. The disclosure involves continuously monitoring signal metrics or load levels from multiple base station coverage areas. Upon detection that a particular metric or load level surpasses a preset threshold, devices in overlapping coverage zones between multiple base stations are identified. Specific devices may then be directed to attach to an alternate base station.

12 Claims, 7 Drawing Sheets

INTER SATELLITE COVERAGE MANAGEMENT

SUMMARY

The present disclosure is directed to improving procedures for use with extraterrestrial base stations, substantially as illustrated in connection with at least one of the Figures, and as set forth more completely in the claims.

In various technological aspects, coverage is facilitated by one or more extraterrestrial base stations. These extraterrestrial base stations might face overloading due to heightened usage or system challenges. An anchor extraterrestrial base station has the capability to track and predict the load for its specific coverage zone. Should this anchor extraterrestrial base station detect or predict an overload, it can pinpoint a coverage overlap with another extraterrestrial base station. To address detected or foreseen overload, the coverage areas of both extraterrestrial base stations can be adjusted and the load equitably distributed based on the imminent or current signal degradation. This adjustment leverages an inter-satellite link, enabling swift exchange of load data and predictions. Through proactive load management and coverage reservation for these extraterrestrial base stations, overloading and performance challenges can be significantly minimized.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

Aspects of the present disclosure are described in detail herein with reference to the attached Figures, which are intended to be exemplary and non-limiting, wherein.

DETAILED DESCRIPTION

Figure 1:
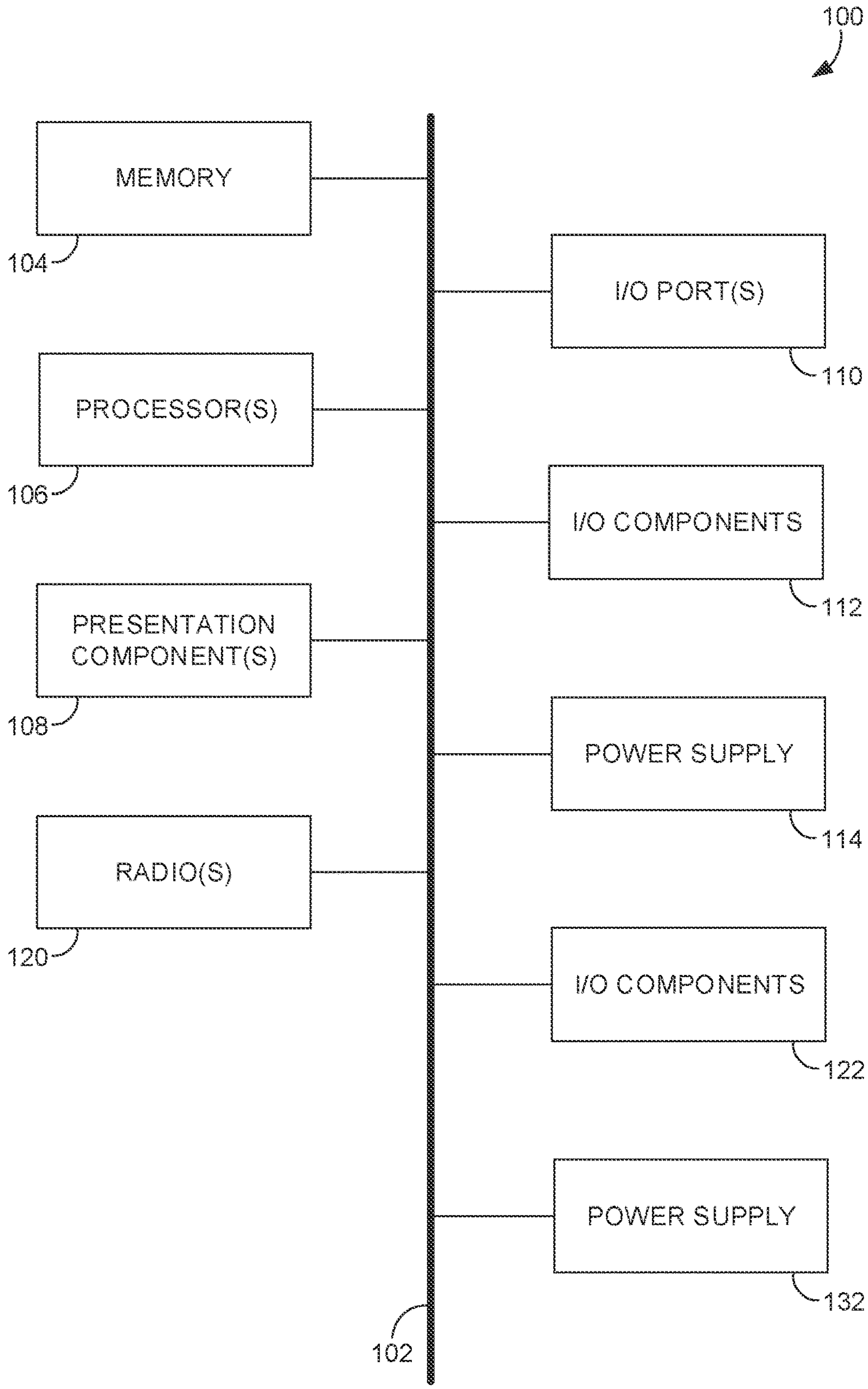
FIG. 1 illustrates an exemplary computing device for use with the present disclosure.

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms “step” and/or “block” may be used herein to connote different elements of methods employed, the terms should not be interpreted as implying any particular order among or between various steps herein disclosed unless and except when the order of individual steps is explicitly described.

Various technical terms, acronyms, and shorthand notations are employed to describe, refer to, and/or aid the understanding of certain concepts pertaining to the present disclosure. Unless otherwise noted, said terms should be understood in the manner they would be used by one with ordinary skill in the telecommunication arts. An illustrative resource that defines these terms can be found in Newton’s Telecom Dictionary, (e.g., 32d Edition, 2022). As used herein, the term “network access technology (NAT)” is synonymous with wireless communication protocol and is an umbrella term used to refer to the particular technological standard/protocol that governs the communication between a UE and a base station; examples of network access technologies include 3G, 4G, 5G, 6G, 802.11x, and the like. The term “node” is used to refer to an access point that transmits signals to a UE and receives signals from the UE in order to allow the UE to connect to a broader data or cellular network (including by way of one or more intermediary networks, gateways, or the like)

Embodiments of the technology described herein may be embodied as, among other things, a method, system, or computer-program product. Accordingly, the embodiments may take the form of a hardware-based embodiment, or an embodiment combining software and hardware. An embodiment takes the form of a computer-program product that includes computer-useable instructions embodied on one or more computer-readable media that may cause one or more computer processing components to perform particular operations or functions.

Computer-readable media include both volatile and nonvolatile media, removable and non-removable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term “modulated data signal” refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

For the purposes of this disclosure, the term “future time” is defined as a predetermined subsequent period or point in time after the current moment. This “future time” can be established based on various parameters such as system cycle times, predictive models, satellite orbits, or user requirements. In the context of extraterrestrial base stations and dynamic beam management, a "future time" might refer to the expected period when a satellite reaches a specific location in its orbit, or when it anticipates a change in communication demand based on predictive analytics. It can be a fixed interval (e.g., minutes, hours, days ahead) or a variable period calculated in real-time based on current data and trends. Further, the term "future location" refers to a predicted or pre-determined spatial position that an entity, such as an extraterrestrial base station or satellite, is expected to occupy at a given "future time." This location is calculated based on various parameters, including but not limited to current trajectories, orbital mechanics, propulsion systems, and external influencing factors like gravitational pulls from celestial bodies. For satellites or extraterrestrial base stations, the "future location" can be derived from established orbital data, predictive algorithms that account for known variables, and real-time tracking.

By way of background, the global telecommunications landscape has undergone rapid transformation due to the surge in demand for seamless and high-speed connectivity. Satellite communication plays a pivotal role in bridging communication gaps, especially in areas where traditional terrestrial networks falter. These satellites, or extraterrestrial base stations, establish coverage areas the Earth's surface, ensuring widespread network availability.

Despite the technological advancements, contemporary satellite communication systems grapple with significant challenges. One of the predominant issues is the rigid and static nature of satellite coverage areas. Given that user demand is not uniformly distributed and can experience spikes due to events, large gatherings, or even natural disasters, certain coverage areas can get overwhelmed. Overloading and signal degradation of these base stations leads to degraded service quality, dropped calls, and slower data speeds. The inability of satellites to dynamically adjust their coverage areas or redistribute their load in real-time exacerbates this problem. Additionally, systems are currently unable to provide adaptable coverage based on current or predicted overloading or degradation of the satellite base stations.

In contrast to conventional solutions and to facilitate a more optimized use of satellite-integrated cellular telecommunication systems, the present disclosure is directed to systems and methods for providing dynamic beam management that takes into account both the satellite's movement and real-time user demand. This ensures that regions on Earth receive optimal signal strength consistently. Additionally, with predictive load management and inter-satellite communication capabilities, satellites can preemptively adjust their coverage to avoid overloads and ensure seamless and reliable operation.

Accordingly, a first aspect of the present disclosure is directed to a dynamic beam management system for extraterrestrial base stations. The system is designed to adaptively adjust coverage areas based on real-time demand or load. Specifically, computer processing components receive signal metrics from multiple extraterrestrial base stations' coverage areas. If a metric exceeds a preset threshold, the system can recalculate optimal coverage areas for the extraterrestrial base stations. Based on this recalculation, the base stations can then adjust their coverage areas to best accommodate the observed demand, ensuring efficient and responsive communication in extraterrestrial settings. Additionally, to balance the load, an extraterrestrial base station might redistribute its load by causing devices being serviced by multiple stations to connect to another extraterrestrial base station.

A second aspect of the present disclosure is directed to a method for dynamic beam management in extraterrestrial base stations. The method includes monitoring load levels in the coverage areas of a first and a second extraterrestrial base station. Upon detecting that a metric exceeds a predetermined threshold, the method involves identifying one or more devices in an overlapping coverage area between a first and a second extraterrestrial base station. Following this identification, the method instructs one or more devices to attach to the second extraterrestrial base station rather than the first. This adjustment ensures that the base stations can swiftly respond to changing communication demands, maximizing the efficacy of the communication channels while preventing potential overloads or system inefficiencies.

Another aspect of the present disclosure is directed to a non-transitory computer readable media having instructions stored thereon that, when executed by one or more computer processing components, cause the one or more computer processing components to perform a method of dynamic management for extraterrestrial base stations. This includes receiving signal quality metrics for a first coverage area of a first extraterrestrial base station and a second coverage area of a second extraterrestrial base station. Upon determining that a signal quality metric exceeds a predetermined threshold, the method then causes one or more devices to attach to the second extraterrestrial base station.

Yet another aspect of the present disclosure is directed to a system includes receiving signal quality metrics for a first coverage area of a first extraterrestrial base station and a second coverage area of a second extraterrestrial base station. Upon determining that a signal quality metric exceeds a predetermined threshold, the method then causes one or more devices to handover from the first extraterrestrial base station to the second extraterrestrial base station.

Yet another aspect of the present disclosure is directed to a system that includes monitoring load levels in the coverage areas of a first and a second extraterrestrial base station. Upon detecting that a metric exceeds a predetermined threshold, the method involves identifying one or more devices in an overlapping coverage area between a first and a second extraterrestrial base station. Following this identification, the system modifies a set of downlink transmission parameters that causes the first extraterrestrial base station to communicate signals to a first portion of the first coverage area and not a second portion of the first coverage area.

Referring to FIG. 1, an exemplary computer environment is shown and designated generally as computing device 100 that is suitable for use in implementations of the present disclosure. Computing device 100 is but one example of a suitable computing environment and is not intended to suggest any limitation as to the scope of use or functionality of the invention. Neither should computing device 100 be interpreted as having any dependency or requirement relating to any one or combination of components illustrated. In aspects, the computing device 100 is generally defined by its capability to transmit one or more signals to an access point and receive one or more signals from the access point (or some other access point); the computing device 100 may be referred to herein as a user equipment, wireless communication device, or user device, The computing device 100 may take many forms; non-limiting examples of the computing device 100 include a fixed wireless access device, cell phone, tablet, internet of things (IOT) device, smart appliance, automotive or aircraft component, pager, personal electronic device, wearable electronic device, activity tracker, desktop computer, laptop, PC, and the like.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 1, computing device 100 includes bus 102 that directly or indirectly couples the following devices: memory 104, one or more processors 106, one or more presentation components 108, input/output (I/O) ports 110, I/O components 112, and power supply 114. Bus 102 represents what may be one or more busses (such as an address bus, data bus, or combination thereof). Although the devices of FIG. 1 are shown with lines for the sake of clarity, in reality, delineating various components is not so clear, and metaphorically, the lines would more accurately be grey and fuzzy. For example, one may consider a presentation component such as a display device to be one of I/O components 112. Also, processors, such as one or more processors 106, have memory. The present disclosure hereof recognizes that such is the nature of the art, and reiterates that FIG. 1 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 1 and refer to "computer" or "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 104 includes computer-storage media in the form of volatile and/or nonvolatile memory. Memory 104 may be removable, non-removable, or a combination thereof. Exemplary memory includes solid-state memory, hard drives, optical-disc drives, etc. Computing device 100 includes one or more processors 106 that read data from various entities such as bus 102, memory 104 or I/O components 112. One or more presentation components 108 presents data indications to a person or other device. Exemplary one or more presentation components 108 include a display device, speaker, printing component, vibrating component, etc. I/O ports 110 allow computing device 100 to be logically coupled to other devices including I/O components 112, some of which may be built in computing device 100. Illustrative I/O components 112 include a microphone, joystick, game pad, satellite dish, scanner, printer, wireless device, etc.

A first radio 120 and second radio 140 represent radios that facilitate communication with one or more wireless networks using one or more wireless links. In aspects, the first radio 120 utilizes a first transmitter 122 to communicate with a wireless network on a first wireless link and the second radio 140 utilizes the second transmitter 132 to communicate on a second wireless link. Though two radios are shown, it is expressly conceived that a computing device with a single radio (i.e., the first radio 120 or the second radio 140) could facilitate communication over one or more wireless links with one or more wireless networks via both the first transmitter 122 and the second transmitter 132. Illustrative wireless telecommunications technologies include CDMA, GPRS, TDMA, GSM, and the like. One or both of the first radio 120 and the second radio 140 may carry wireless communication functions or operations using any number of desirable wireless communication protocols, including 802.11 (Wi-Fi), WiMAX, LTE, 3G, 4G, LTE, 5G, NR, VOLTE, or other VoIP communications. In aspects, the first radio 120 and the second radio 140 may be configured to communicate using the same protocol but in other aspects they may be configured to communicate using different protocols. In some embodiments, including those that both radios or both wireless links are configured for communicating using the same protocol, the first radio 120 and the second radio 140 may be configured to communicate on distinct frequencies or frequency bands (e.g., as part of a carrier aggregation scheme). As can be appreciated, in various embodiments, each of the first radio 120 and the second radio 140 can be configured to support multiple technologies and/or multiple frequencies; for example, the first radio 120 may be configured to communicate with a base station according to a cellular communication protocol (e.g., 4G, 5G, 6G, or the like), and the second radio 140 may configured to communicate with one or more other computing devices according to a local area communication protocol (e.g., IEEE 802.11 series, Bluetooth, NFC, z-wave, or the like).

Figure 2:
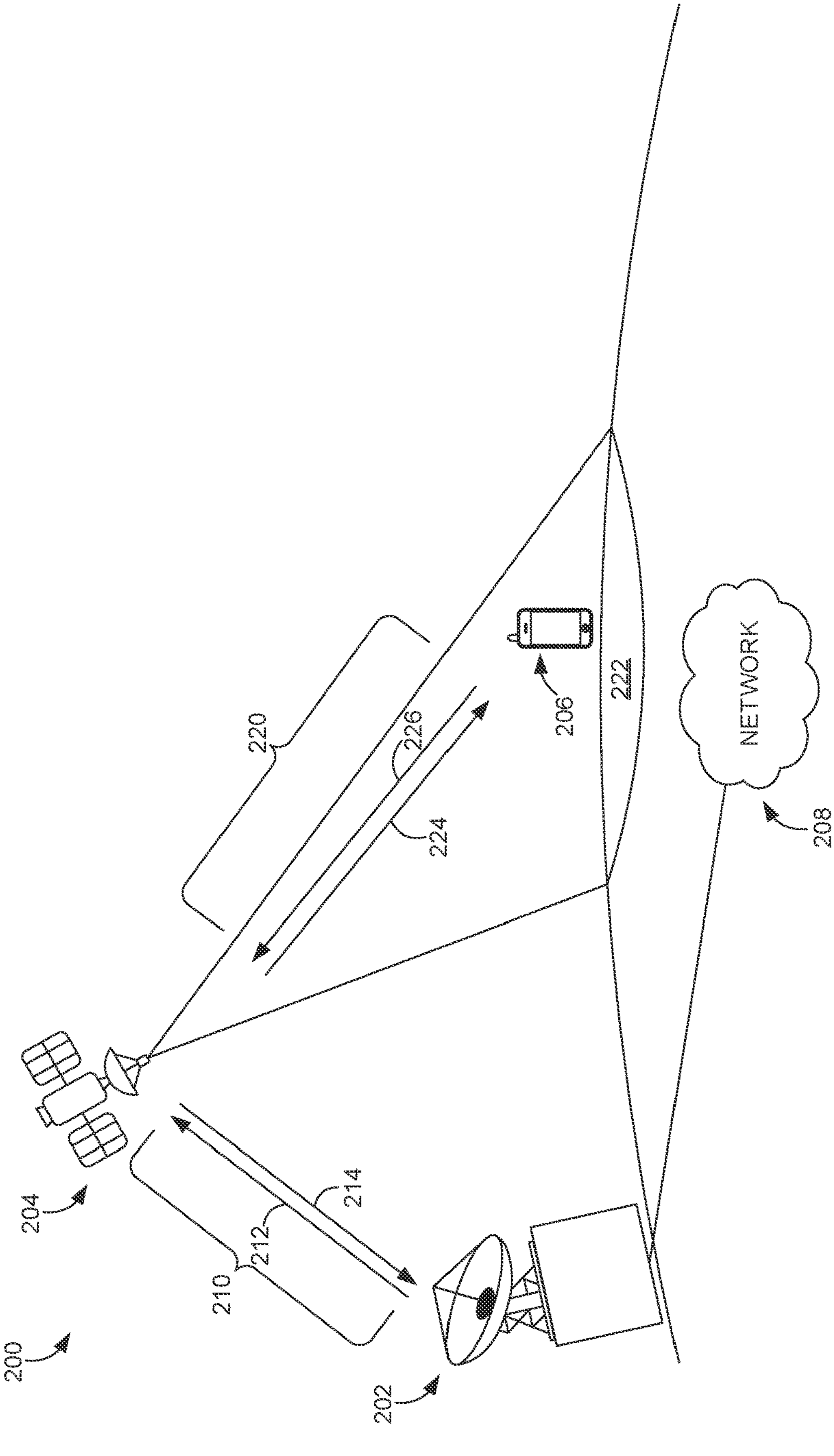
FIG. 2 illustrates a diagram of an exemplary environment in which implementations of the present disclosure may be employed.

Turning now to FIG. 2, an exemplary network environment is illustrated in which implementations of the present disclosure may be employed. Such a network environment is illustrated and designated generally as network environment 200. At a high level the network environment 200 comprises a gateway 202, a satellite 204 of a satellite radio access network (RAN), a UE 206, and a network 208.

Satellite 204 or any other satellite may be referred to as an extraterrestrial base station herein. In some embodiments, an extraterrestrial base station refers to a satellite such as satellite 204 or space station. Though the composition of network environment 200 illustrates objects in the singular, it should be understood that more than one of each component is expressly conceived as being within the bounds of the present disclosure; for example, the network environment 200 may comprise multiple gateways, multiple distinct networks, multiple UEs, multiple satellites that communicate with a single gateway, and the like. Similarly, though certain objects of network environment 200 are illustrated in a certain form, it should be understood that they may take other forms; for example, even though the UE 206 is illustrated as a cellular phone, a UE suitable for implementations with the present disclosure may be any computing device having any one or more aspects described with respect to FIG. 1

The network environment 200 includes a gateway 202 communicatively connected to the network 208 and the satellite 204. The gateway 202 may be connected to the network 208 via one or more wireless or wired connections and is connected to the satellite 204 via a feeder link 210. The gateway 202 may take the form of a device or a system of components configured to communicate with the UE 206 via the satellite 204 and to provide an interface between the network 208 and the satellite 204. Generally, the gateway 202 utilizes one or more antennas to transmit signals to the satellite 204 via a forward uplink 212 and to receive signals from the satellite 204 via a return downlink 214. The gateway 202 may communicate with a plurality of satellites, including the satellite 204. The network 208 comprises any one or more public or private networks, any one or more of which may be configured as a satellite network, a publicly switched telephony network (PSTN), or a cellular telecommunications network. In aspects, the network 208 may comprise a satellite network connecting a plurality of gateways (including the gateway 202) to other networks, a cellular core network (e.g., a 4G, 5G, of 6G core network, an IMS network, and the like), and a data network. In such aspects, each of the satellite network and the cellular core network may be associated with a network identifier such as a public land mobile network (PLMN), a mobile country code, a mobile network code, or the like, wherein the network identifier associated with the satellite network is the same or different than the network identifier associated with the cellular network.

The network environment 200 includes one or more satellites, represented by satellite 204. The satellite 204 is generally configured to relay communications between the gateway 202 and the UE 206. The satellite 204 communicates with the gateway using the feeder link 210 and communicates with the UE 206 using a user link 220. The user link 220 comprises a forward downlink 224 used to communicate signals from the satellite 204 to the UE 206 and a return uplink 226 used to communicate signals from the UE 206 to the satellite 204. The satellite 204 may communicate with the UE 206 using any wireless telecommunication protocol desired by a network operator, including but not limited to 3G, 4G, 5G, 6G, 802.11x and the like. Though shown as having a single beam providing coverage to a satellite coverage area 222, the satellite 204 may be configured to utilize a plurality of individual beams to communicate with multiple different areas at or near the same time. Similarly, though a single forward downlink 224 and a single return uplink 226 are illustrated, the UE 206 may utilize multiple downlinks and/or multiple uplinks to communicate with the satellite 204, using any one or more frequencies as desired by a satellite or network operator.

Generally, the satellite 204 is characterized by its orbit around the Earth. The orbit of any particular satellite will vary by operator desire and/or intended use; for example, a satellite suitable for use with the present disclosure may be characterized by its maximum orbital altitude and/or orbital period as Low Earth Orbit (LEO), Medium Earth Orbit (MEO), and High Earth Orbit (HEO)—also referred to herein as characterizing an orbital plane. Though not rigidly defined, an LEO satellite may orbit with a maximum orbital altitude of less than approximately 1,250 miles, an MEO satellite may orbit with a maximum orbital altitude generally between 1,250 and 22,000 miles, and an HEO satellite may orbit with a maximum orbital altitude of greater than approximately 22,000 miles. In some, but not all cases, a satellite in HEO may be considered geosynchronous (i.e., geosynchronous Earth orbit (GEO)) on the basis that its orbital period is approximately equal to the length of a sidereal or solar day (approximately 24 hours); generally, a satellite in geosynchronous orbit will appear to be in the same position relative to a fixed point on the surface of the Earth at the same time each day. A geostationary orbit is a special type of geosynchronous orbit with the Earth's equator with each of an eccentricity and inclination equal to zero. Some satellites in HEO and all that are in LEO or MEO have an orbital period that is different than the length of a sidereal/solar day and are considered to be non-geosynchronous and do not remain stationary relative to a fixed position on the surface of the Earth. As used herein, a satellite in LEO has a lower orbital plane than a satellite in MEO or HEO, an MEO satellite has a higher orbital plane than a satellite in LEO, and an HEO satellite has a higher orbital plane than a satellite in LEO or MEO.

Figure 3A:
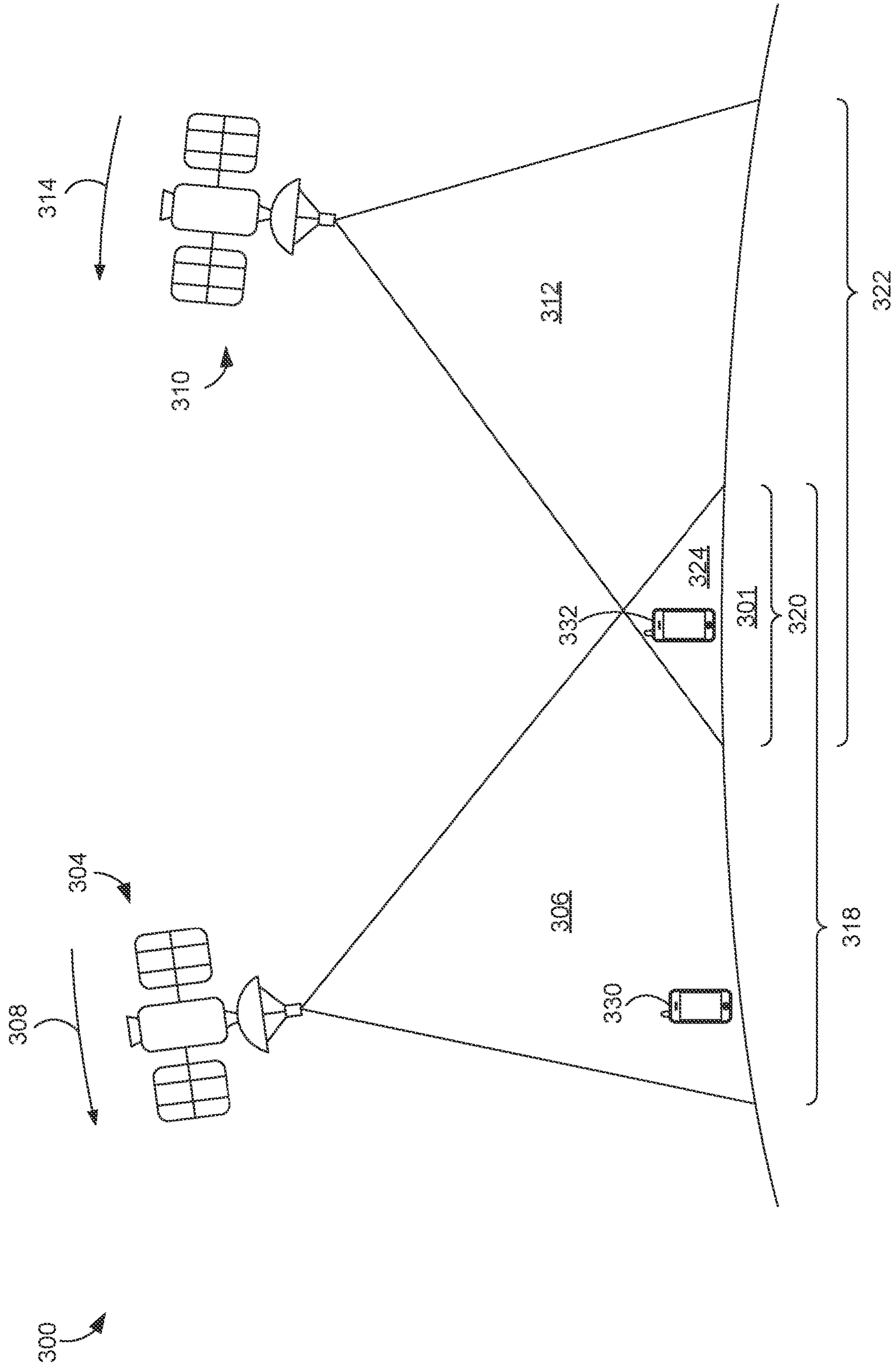
FIG. 3A, FIG. 3B, and FIG. 3C illustrate exemplary environments in which implementations of the present disclosure may be employed.
Figure 3B:
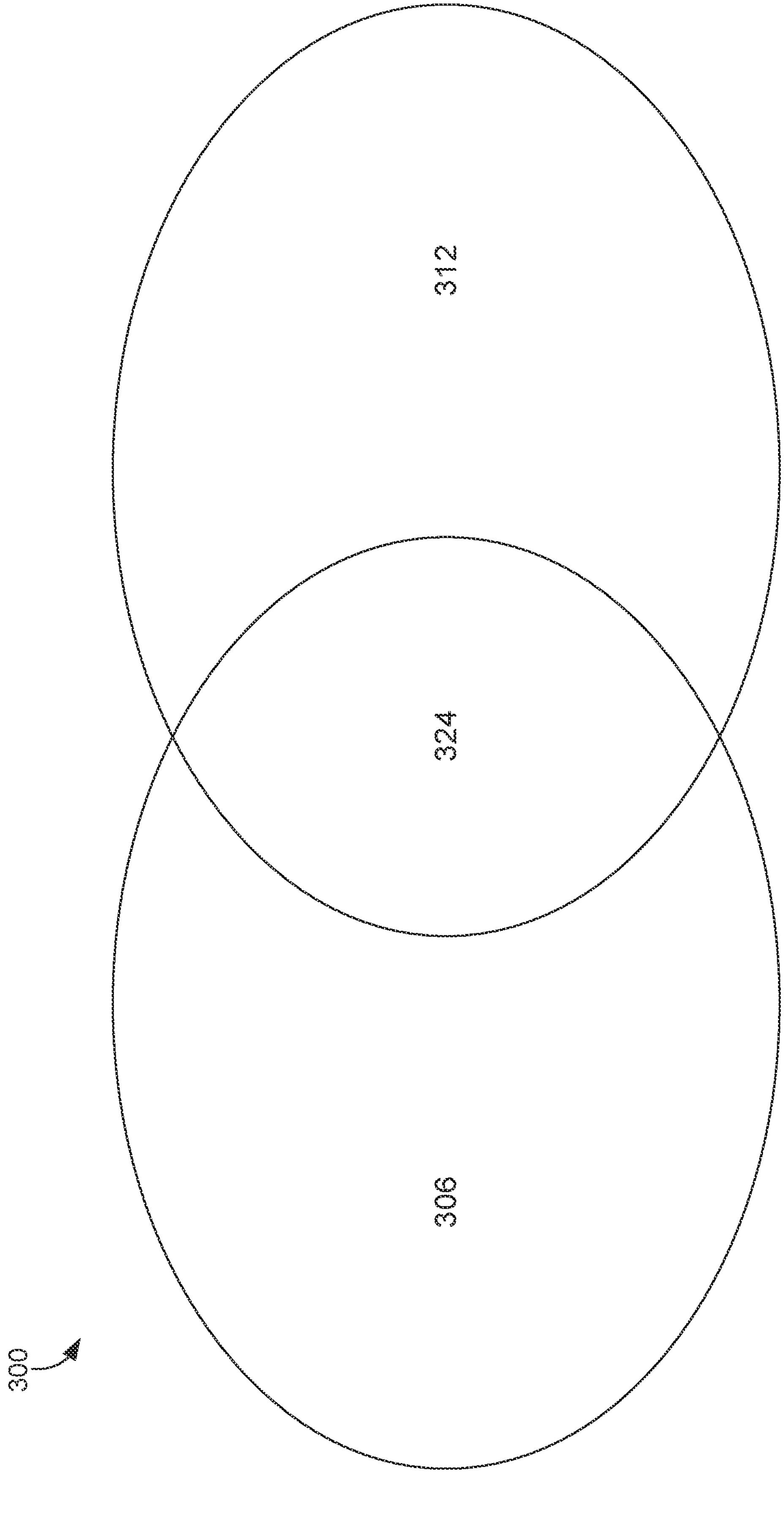
Figure 3C:
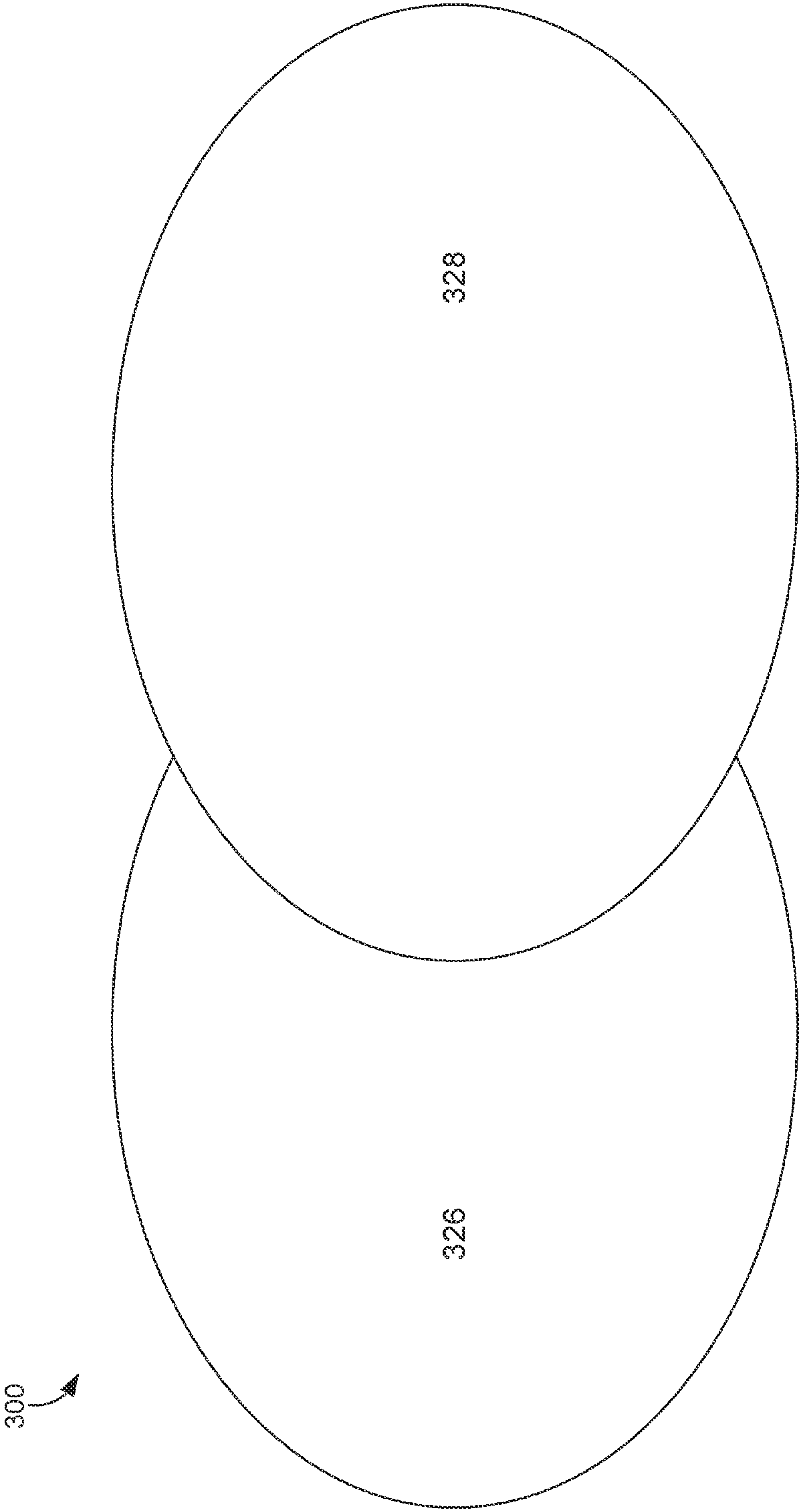

Turning now to FIGS. 3A through 3C, an exemplary network environment is illustrated in which implementations of the present disclosure may be employed. Such a network environment is illustrated and designated generally as network environment 300. The network environment 300 generally comprises one or more satellites, such as a first satellite 304 and a second satellite 310 and a first UE 330 at or near a surface of the Earth 301. The network environment 300 includes one or more components or functions of the network environment 200 of FIG. 2; for example, each of the first satellite 304 and the second satellite 310 of the network environment 300 have any one or more aspects of the satellite 204, and the first UE 330 of the network environment 300 have any one or more aspects of the UE 206 of network environment 200 in FIG. 2. Further, the first UE 330 and the second UE 332 are configured with one or more location services, when utilized by the first UE 330 and second UE 332, allow the first UE 330 and second UE 332 to determine their location on the Earth 301; such location services may relevantly include one or more satellite location services (e.g., global positioning system (GPS)).

In one example, the first satellite 304 has a specific orbit that determines its position relative to the Earth 301, affecting where it projects its coverage. A first coverage area 306 is the primary zone that the first satellite 304 can service. The first coverage area 306 is a three-dimensional region in space that represents the range within which devices or relay stations can communicate directly with the first satellite 304. A first Earth coverage area 318 represents the region on the surface of Earth 301 that falls within the first coverage area 306. Devices, such as the first UE 330 or communication towers within the first coverage area 306, can establish a connection with the first satellite 304. The exact shape and size of the first Earth coverage area 318 and first coverage area 306 depend on the satellite's altitude, orbit inclination, and the communication beam's management mechanism.

The second satellite 310 has its own orbit, which determines where its coverage area is projected on Earth 301. A second coverage area 312 is a primary serviceable zone for second satellite 310. Devices or relay stations within the second coverage area 312 can establish communication with the second satellite 310. Translated from the second coverage area 312, the second Earth coverage area 322 is where devices can connect with the second satellite 310. The shape and size of second coverage area 312 are influenced by various orbital and technical parameters. Given the constant movement of satellites and the vast expanse of their coverage areas, there are instances where Earth coverage areas of multiple satellites overlap. In the current example described in FIG. 3A and FIG. 3B, the first Earth coverage area 318 of the first satellite 304 and the second Earth coverage area 322 of the second satellite 310 intersect, creating an overlapping coverage area 324 and an overlapping Earth coverage area 320. Devices within the overlapping coverage area 324 can connect to either the first satellite 304 or the second satellite 310. Additionally, the shape and location of the coverage areas can be manipulated so the overlapping coverage area 324 is reduced in size and UEs can be serviced by a single satellite.

An exemplary aerial perspective of the network environment is shown in FIG. 3B. For example, the aerial perspective view of the first coverage area 306, the second coverage area 312 and the overlapping coverage area 324 is shown. The size and shape of each of the first coverage area 306 and the second coverage area 312 are adjustable to provide coverage to particular areas or zones using beam management and beam shaping. Beam management and shaping for each of the first satellite 304 and second satellite 310 is accomplished by manipulating the characteristics of transmitted beams to create coverage areas, such as first coverage area 306 and second coverage area 312. The first satellite 304 and the second satellite 310 can employ one or more phased array antennas, which consist of multiple antenna elements. By controlling the phase and amplitude of the signal at each element, the first satellite 304 and the second satellite 310 can electronically steer the direction, shape, and/or size of the emitted beam without physically moving the antenna.

In an additional example, the first satellite 304 and the second satellite 310 can physically pivot or rotate the antenna or antenna elements to change the beam's direction to adjust the size and shape of the first coverage area 306 and the second coverage area 312. Beams can be shaped as broad beams covering large areas or as spot beams focused on smaller regions. In another example, through beam shaping, the first satellite 304 and the second satellite 310 can minimize side lobes to adjust the size and shape of the first coverage area 306 and the second coverage area 312.

The location of each of the satellite coverage areas, such as first coverage area 306 and second coverage area 312, can be determined by direct communication with the first UE 330, external source data, and/or communication directly with other satellites, such as between the first satellite 304 and the second satellite 310. The first satellite 304 can move along a first track 308 and the second satellite 310 can move along a second track 314. In an exemplary embodiment, the first satellite 304 and the second satellite 310 can operate within a geo-synchronous orbit such that the first satellite 304 and the second satellite 310 do not change positon relative to the Earth 301. In an additional example, the first satellite 304 and the second satellite 310 operate in either LEO or MEO and are in constant motion with respect to the Earth 301.

In order to identify and predict the current and future coverage area locations for each of the first coverage area 306 and the second coverage area 312, the first satellite 304 may query a locally stored record (i.e., dataset). The locally stored record is populated by either constellation information obtained from an external source and/or created based on observations by the first satellite 304.

The first satellite 304 may determine a satellite coverage area location, size, and shape based on information the first satellite 304 receives from an external source. Such external source data may comprise actual coverage area, corresponding to times and locations where the first satellite 304 and the second satellite 310 can expect to provide coverage. The external source data may also comprise at least partial constellation information relating to a constellation of satellites designed to provide wireless telecommunication services. External data relating to expected coverage area(s) may take any desirable form but would generally be usable to provide the first satellite 304 or the second satellite 310 with an indication that coverage can be expected in a particular time at a particular location (or within a particular range of a particular location). The first satellite 304 and the second satellite 310 may be provided with an indication that coverage is to be expected in an area (e.g., a circular, ovular, or hexagonal area) at least partially defined by a radius (e.g., 100 miles) of a center point that at least approximately represents the center point of the geographic coverage area on a particular date and time. For example, external coverage data may indicate that a circular area of coverage will be centered at a geographic location of 39°59'2.05"N 93°58'36.19"W and will have a radius of 100 miles at a particular time on a particular day. The first satellite 304 and the second satellite 310 can utilize the data to determine that a specific area is within the 100 mile radius of the geographic center point at that particular location at that particular time. In some aspects, the external source data may take the form of a lookup table comprising dates/times, a center point, and a radius of coverage. In other aspects, the external source data may comprise extraterrestrial constellation information.

Overlapping coverage areas between two or more satellites can be determined based on synchronization signals received by one or more UEs, such as the first UE 330. When the first UE 330 finds itself within an overlapping coverage area 324, the first UE 330 can detect synchronization signals from two or more satellites. In such instances, the first UE 330 may generate an indication, notifying the network of this simultaneous detection. This indication can comprise information about the received signal strength from each satellite, the identity of the satellites, and the first UE 330 location. The network, upon receiving such feedback, can deduce that the first UE 330 is within the overlapping coverage area 324.

Figure 4:
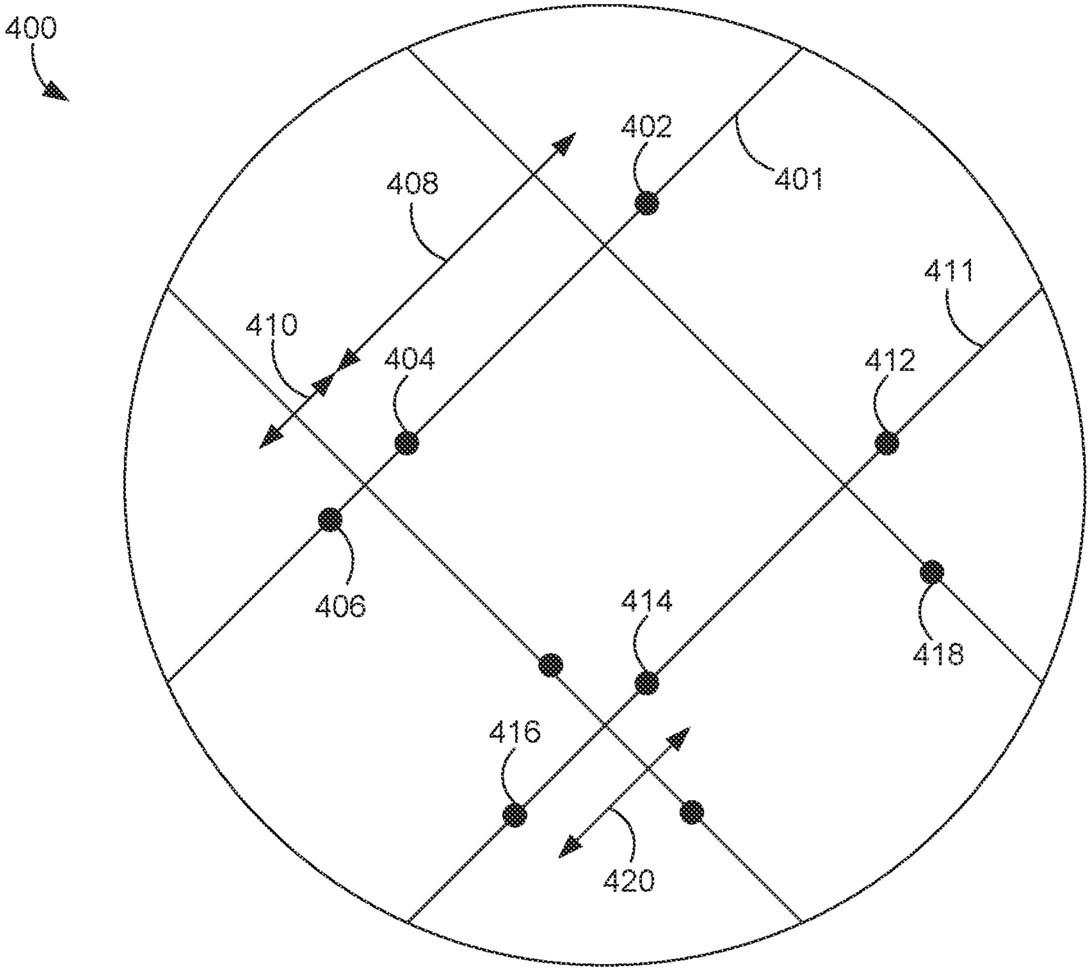
FIG. 4 illustrates a model of a satellite constellation, for use with one or more aspects of the present disclosure.

Turning now to FIG. 4, external source data comprising extraterrestrial constellation information is illustrated. The constellation information at least partially represents a satellite constellation 400. The constellation data may comprise indications that the satellite constellation includes one or more satellites; for example, the external constellation data may comprise a first satellite 402 which may represent the first satellite 304 of FIG. 3, a second satellite 404 which may represent the second satellite 310 of FIG. 3, a third satellite 406, a fourth satellite 412, a fifth satellite 414, and a sixth satellite 416. The constellation data may include indications that each of the first satellite 402, the second satellite 404, and the third satellite 406 travel along a first orbital path 401. The first satellite 402 may be separated from the second satellite 404 by a first distance 408 and the second satellite 404 may be separated from the third satellite 406 by a second distance 410, wherein the first distance 408 may be equal to or different than the second distance 410. Similarly, constellation data may comprise information that each of the fourth satellite 412, the fifth satellite 414, and the sixth satellite 416 travel along a second orbital path 411. The fourth satellite 412 may be separated from the second satellite 404 by a third distance 418 and the fifth satellite 414 may be separated from the sixth satellite 416 by a fourth distance 420, wherein the third distance 418 may be equal to or different than the fourth distance 420, the first distance 408, and the second distance 410.

Based on the external constellation data comprising the time, location, and track of one or more satellites, the first satellite 304 and/or the second satellite 310 of FIG. 3 can model, calculate, or otherwise determine a current position of the coverage areas for the first satellite 304 and the second satellite 310 on the surface of the Earth. Further, based on the current positions of the first satellite 304 and/or the second satellite 310 of FIG. 3, and the movements of the first satellite 304 and the second satellite 310, the first satellite 304 can model, calculate, or otherwise determine a predicted future coverage area of the first satellite 304 and the second satellite 310.

Overlapping coverage areas between two or more satellites can be determined based on synchronization signals received by one or more UEs, such as second UE 332. When the second UE 332 finds itself within an overlapping coverage area 324, the second UE 332 can detect synchronization signals from two or more satellites. In such instances, the UE 332 may generate an indication, notifying the network of this simultaneous detection. This indication can comprise information about the received signal strength from each satellite, the identity of the satellites, and the second UE 332 location. The network, upon receiving such feedback, can deduce that the second UE 332 is within the overlapping coverage area 324.

Referring back to FIG. 3, the first satellite 304 continually monitors traffic, loading conditions, and overall capacity within the first coverage area 306. The first satellite 304 assesses transmitted data units or packets between itself and UEs, such as the first UE 330, in the first coverage area 306. The traffic volume within this area is gauged by tracking the number of packets per specific time frame. Alongside, the first satellite 304 keeps tabs on active sessions or connections, like mobile devices. The first satellite 304 may also evaluate resource utilization metrics, including bandwidth, onboard processing capability, and transponder power, to comprehend the satellite's load status at any instance.

The first satellite 304 can pinpoint specific locations of overloading within the first coverage area 306. For instance, as devices, such as the first UE 330, establish or maintain communication via the first satellite 304, they dispatch uplink signals. A pronounced surge in these signals from a distinct region might signify a high-demand or overloading scenario. The first satellite 304 can also employ beamforming techniques, in which multiple antennas work together to generate focused beams. Analyzing which beams are experiencing high traffic aids in locating the overload areas.

The first satellite 304 can detect regions of high activity or user density by evaluating the volume of data packets or connection inquiries from specific sub-regions within the coverage area. Key indicators of potential overloading include increased latency, reduced data transfer rates, and dropped connections. Additionally, devices like the first UE 330 or relay stations might provide geotagged feedback about the quality of connection, aiding the satellite in identifying areas with compromised service due to overload. Should any monitored metrics surpass set thresholds, an overload event is determined to have occurred or will occur. This overload event triggers the process to optimize the coverage areas for both first satellite 304 and its counterpart, second satellite 310.

In an additional aspect, the first satellite 304 can determine if an overload condition or threshold degradation has occurred. An overload condition arises when the resources and functionalities of the first satellite 304 are utilized up to or beyond their maximum intended capacity. Such situations might occur when the bandwidth of the first satellite 304 is fully consumed, there's a spike in the number of active connections beyond its designated capability, or when its processing power becomes overwhelmed due to unforeseen demands.

Threshold degradation is determined to occur when monitored metrics either exceed or drop below pre-determined threshold values. Metrics that can be monitored include, but are not limited to, signal strength, data transfer rates, connection latency, packet loss rates, signal to interference and noise ratio (SINR), reference signal receive power (RSRP), reference signal received quality (RSRQ), receive signal strength indicator (RSSI), channel quality indicator, and block error rate. Each of the metrics are monitored for the first satellite 304 and the first coverage area 306. If any of the metrics breach a pre-determined threshold, it signals that threshold degradation has occurred. As an example, if the RSRP value for the first satellite 304 fall below 95 dBm, a threshold degradation may be determined to be occurring. This would signify that the signal quality for the UEs attached to the first satellite 304 has fallen below a threshold and either handover procedures or a re-alignment of the coverage areas must occur.

Additionally, channel quality information may be monitored to indicate a degradation of a realized uplink and/or downlink transmission data rate, observed SINR, RSRQ, and/or signal strength at the user device, or throughput of the connection. Channel quality information may be provided via, for example, an uplink pilot time slot, downlink pilot time slot, sounding reference signal, CQI, rank indicator, precoding matrix indicator, or some combination thereof. Channel quality information may be determined to indicate a threshold degradation, for example, based on exceeding or being less than a threshold.

In further aspects, the first satellite 304 can determine that an overload condition or a threshold degradation is likely to occur. An impending overload condition is predicted when the resources and functionalities of the first satellite 304 approach their maximum intended capacity. Such situations might arise if projections show that the bandwidth of the first satellite 304 will soon be fully consumed, there's an anticipated spike in the number of active connections beyond its designated capability, or its processing power is expected to be overwhelmed by upcoming demands. Further, a likelihood of threshold degradation can be determined when monitored metrics approach pre-determined threshold values. If any of the metrics near a pre-determined threshold, or are predicted to approach the pre-determined threshold, it signals a potential degradation in the future.

The first satellite 304 can employ predictive analyses. Predictive analysis anticipates or predicts future overloading (i.e. an overload event) or future threshold degradation in future coverage areas of the first satellite 304. The predictions can be based on variables such as satellite trajectories, impending satellite locations, prevailing loading factors, monitored metrics, predicted metrics, and the current shape and magnitude of coverage areas. External cues, like major scheduled events in specific regions (e.g., concerts, sports events), can also be incorporated into the predictive analysis. An overload event or threshold degradation, either ongoing or forthcoming is identified by the surpassing of one or more preset metric thresholds. For example, an overload might be identified if the first satellite 304 observes a call drop rate exceeding a threshold.

The first satellite 304 can predict future overload events or future threshold degradation in future coverage areas of the first satellite 304 by analyzing patterns in connection requests, traffic, and signal strengths. Future coverage projections are determined based on satellite motion and the ability of the first satellite 304 to provide coverage, as described above. Upon identifying or predicting an overload event or future degradation, the first satellite 304 formulates future coverage areas for the first satellite 304 and the second satellite 310. These are determined based on future temporal points and anticipated satellite positions. Taking these predicted coverage areas, along with current overload events or future predicted overload events, the first satellite 304 can identify or determine the optimal coverage regions for both the first satellite 304 and the second satellite 310. The optimal coverage regions are determined using an optimization algorithm such that future and current overload events associated with the first satellite 304 and the second satellite 310 are reduced. Examples of employed optimization algorithm techniques include linear programming (LP), integer programming, gradient descent for optimal beam configuration, and particle swarm optimization for real-time beam adjustments. Machine learning models, fed with historical data, might also be used to recommend beam adjustments based on a myriad of real-time data, encompassing current and predicted user distributions, traffic loads, and satellite positions. The future predicted threshold degradation can be based on the predicted metrics at a future time exceeding a threshold or falling below a threshold. For example, the metric SINR may be anticipated to increase at a particular time based on a predicted increase in traffic at a particular location. Based on this predicted increase, the SINR may be predicted to exceed a threshold value thus predicting a threshold degradation at a future time.

Once the first satellite 304 identifies overloading or threshold degradation, at least one change must occur within the first coverage area 306 to reduce the effects of the overloading and degradation. To make this change, the first satellite 304 can identify one or more UEs that are currently being serviced by two or more satellites. By doing so, the first satellite 304 can force those UEs to attach to a satellite that is not the first satellite 304, thus reducing the number of UEs attached to the first satellite 304.

In one example, the first satellite 304 is able to determine that second UE 332 is in an area of overlapping coverage, such as overlapping coverage area 324. To determine the second UE 332 location, the first satellite 304 can analyze the signal strength and quality metrics received from second UE 332, comparing these metrics with the expected metrics from a known coverage map. Additionally, the second UE 332 can determine it is located within the overlapping coverage area 324. When second UE 332 communicates with multiple satellites, the interference pattern and reception clarity can indicate that second UE 332 is in the overlapping coverage area 324. Furthermore, the second UE 332 can directly transmit synchronization signals or feedback to two or more satellites, indicating its simultaneous reception of signals from more than one satellite and the indication that the second UE 332 is in the overlapping coverage area 324. Once the second UE 332 determines that it is within the overlapping coverage area 324, it can communicate an indication to the first satellite 304 that it is currently located in the overlapping coverage area 324.

In some aspects, when the first satellite 304 identifies an overload event or recognizes that a threshold degradation level has been reached, the first satellite 304 determines that the second UE 332 is located within the overlapping coverage area 324. The first satellite may then initiate a handover procedure for the second UE 332 from the first satellite 304 to the second satellite 310. The determination that the second UE 332 is located within the overlapping coverage area 324 may also trigger the issuance of a cell reselection instruction to the second UE 332. This instruction causes the second UE 332 to end the attachment with the first satellite 304 and instead attach to the second satellite 310. In some aspects, the second UE 332, due to its inherent algorithms or preferences, may be inclined to stay connected to the first satellite 304 based on traditional metrics like signal strength or quality. In such situations, the cell reselection directive would override these default behaviors.

The handover procedure can be a process wherein the second UE 332 shifts its connection from the first satellite 304 to the second satellite 310. During this procedure, the network ensures that the second UE 332 remains connected and there's minimal disruption to the ongoing communication or data transfer. The initiation of the handover procedure can be triggered by the determination that an overload event has occurred or that a degradation threshold has been met. Once initiated, the first satellite 304 communicates with the second satellite 310 to prepare it to take over the connection. Necessary context and parameters related to the second UE 332 are communicated. Upon successful preparation, the second UE 332 is instructed to switch its connection from the first satellite 304 to the second satellite 310.

In additional aspects, the first satellite 304 identifies an overload event or determines that a threshold degradation level has been reached. Concurrently, the first satellite 304 determines that the second UE 332 is located within the overlapping coverage area 324. When this occurs, the first satellite 304 may modify an area that the first satellite communicates downlink signals to create a first optimized coverage area 326. The first optimized coverage area 326 can comprise an area wherein downlink signals are not communicated to by the second satellite. Further, in this example, the second UE 332 is located within a second optimized coverage area 328, not covered or serviced by the first satellite 304.

Building on the concept of satellite management and overloading or degradation mitigation, the first satellite 304 can identify optimized coverage areas for itself and the second satellite 310. The optimized coverage areas are identified based on the location of the overlapping coverage area 324 and reallocating resources used to serve UEs found within that area. For example, if the second UE 332 is located within the overlapping coverage area 324, the first satellite 304 could determine that a new optimized coverage area for the first satellite 304 would exclude the location of the second UE 332. By constructing the optimized coverage area this way, the first satellite 304 would reduce the number of UEs attached to it and thus mitigate any overloading or degradation.

In one aspect the first satellite 304 determines optimized future coverage areas for both the first satellite 304 and the second satellite 310 using an optimization algorithm. The algorithm incorporates predicted future locations for both the first satellite 304 and the second satellite 310, the locations of UEs attached to the first satellite 304 and the second satellite 310, the location of an overlapping coverage area 324, and predicted loading conditions and degradation, including traffic and signal quality, for the two satellites and their future locations. These predictions ensure that the resources of both satellites are judiciously allocated, preventing any overload or degradation situations.

Referring to FIG. 3C, an exemplary depiction of a network environment, designated as network environment 300, demonstrates the practical applications of this disclosure. Here, the first optimized coverage area 326 symbolizes the future coverage projected by the first satellite 304, and the second optimized coverage area 328 represents the forecasted domain of the second satellite 310. These optimized coverage areas are derived from calculations factoring in predictive satellite positioning and a set of anticipated variables, including signal conditions, traffic forecasts, and load estimations. The primary objective is to reduce the likelihood of overload events or degradation. For illustrative purposes, based on this prediction model, the first satellite 304 might project a threshold degradation. In response, it would determine the optimal spatial boundaries for both the first satellite 304 and the second satellite 310 coverage domains, represented by the first optimized coverage area 326 and the second optimized coverage area 328.

In one example, as a result of the first satellite 304 experiencing or predicted to experience degradation, the new optimized coverage areas are determined based on a goal to reduce degradation and overloading. In this example, the second UE 332, which was previously in the overlapping coverage area 324, is located within the second optimized coverage area 328 for efficient network resource allocation. By strategically placing the second UE 332 within the second optimized coverage area 328, the system ensures that the second UE 332 receives optimal signal quality, reduced interference, and has an enhanced likelihood of consistent, high-speed data throughput, thus improving overall network efficiency.

Referring back to FIG. 3A, the first satellite 304 initiates communication of these optimized coverage areas through an inter-satellite link (ISL). This communication is established using either Free Space Optics (FSO) or Radio Frequency (RF) links, enabling the satellites to exchange information about load metrics, predictive analytics, and the strategic adjustment of overlapping coverage areas. Prior to reaching the predicted future location and after finalizing the first optimized coverage area 326 and the second optimized coverage area 328, the first satellite 304 instructs an antenna array associated with the first satellite 304 to offer coverage conforming to the predetermined optimized area, such as the first optimized coverage area 326 at the future location and future time. Similarly, the first satellite 304, prior to being positioned at its predicted location, instructs the second satellite 310 to ensure coverage corresponding to the second optimized coverage area 328 once located at the predicted location.

In response to determining the optimal coverage areas for each satellite and providing instructions to each satellite, each of the first satellite 304 or the second satellite 310 can alter their respective beams or coverage areas to provide coverage such as first optimized coverage area 326 or the second optimal coverage area 328. Each of the first satellite 304 and the second satellite 310 can manipulate the directionality and shape of the emitted radio waves. The first satellite 304 or the second satellite 310 can adaptively adjust their beam or coverage areas using onboard phased array antenna systems. The phased array system consists of multiple antenna elements, each capable of emitting its own signal. The satellites can control the phase and amplitude of each antenna element's signal, which determines the direction and shape of the resultant beam to match the first optimized coverage area 326 and/or the second optimized coverage area 328.

Figure 5:
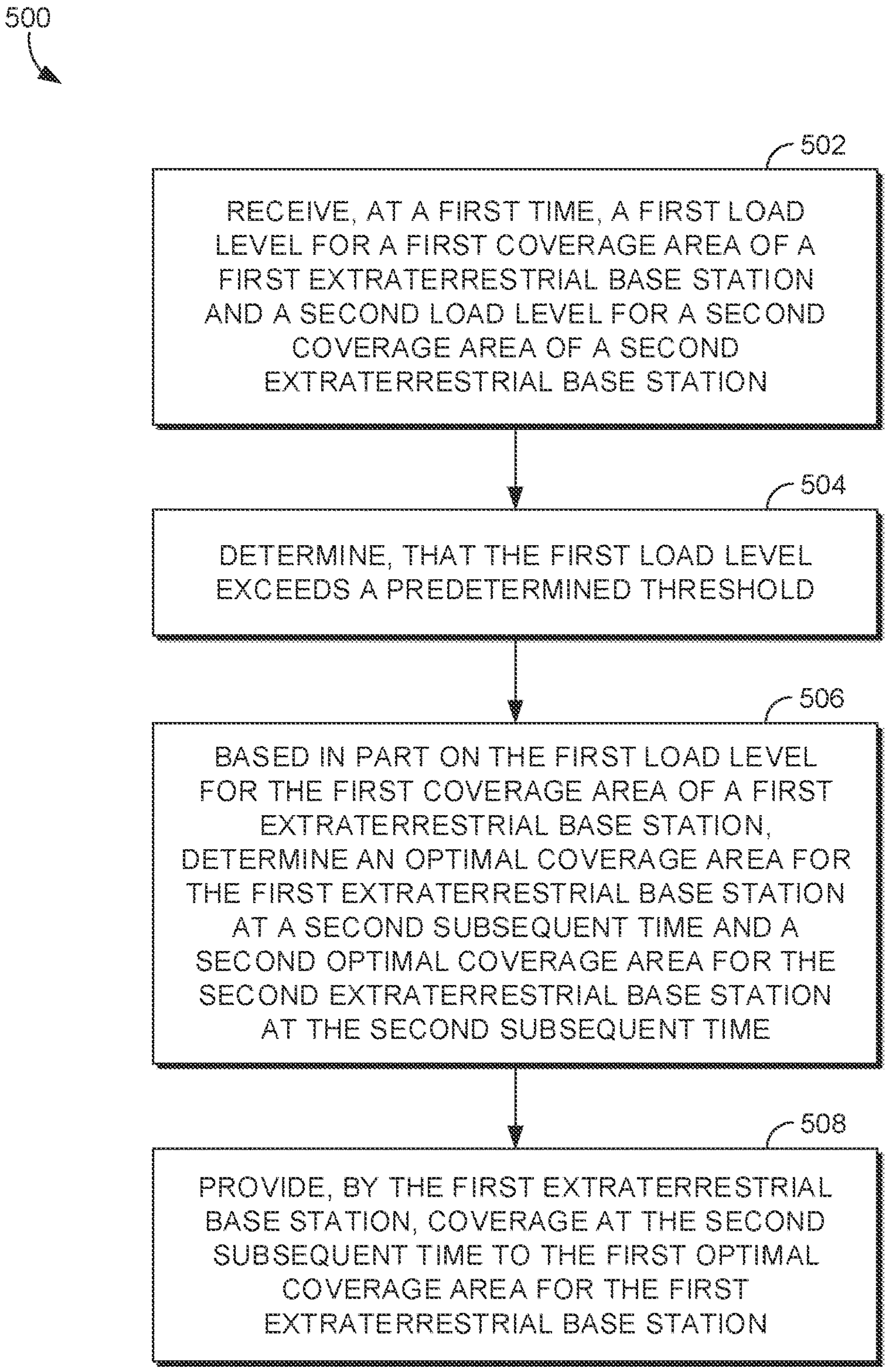
FIG. 5 depicts a flow diagram of an exemplary method for multi-satellite optimization, in accordance with embodiments described herein.

Turning now to FIG. 5, a flow chart representing a method 500 is provided. At a first step 502, a first load level for a first coverage area of a first extraterrestrial base station and a second load level for a second coverage area of a second extraterrestrial base station is received at a first time, according to any one or more aspects described with respect to FIGS. 2-4. At a second step 504, the first extraterrestrial base station determines that the first load level exceeds a predetermined threshold, according to any one or more aspects described with respect to FIGS. 2-4. At a third step 506, based in part on the first load level for the first coverage area of a first extraterrestrial base station, an optimal coverage area for the first extraterrestrial base station at a second subsequent time and a second optimal coverage area for the second extraterrestrial base station at the second subsequent time are determined, according to any one or more aspects described with respect to FIGS. 2-4. At a fourth step 508 coverage at the second subsequent time to the first optimal coverage area for the first extraterrestrial base station is provided, according to any one or more aspects described with respect to FIGS. 2-4.

Many different arrangements of the various components depicted, as well as components not shown, are possible without departing from the scope of the claims below. Embodiments in this disclosure are described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in the limiting sense, and the scope of embodiments is defined by the appended claims and their equivalents.

What is claimed is:

1. A system for performing inter extraterrestrial base station beam management, the system comprising:

one or more extraterrestrial base stations of a radio access network; and one or more computer processing components configured to perform operations comprising:

monitoring, one or more metrics associated with a first coverage area of a first extraterrestrial base station;

determining, that at least one of the one or more metrics associated with the first coverage area exceeds a predetermined threshold;

determining that a first user equipment (UE) is located within an overlapping coverage area between the first extraterrestrial base station and a second extraterrestrial base station;

transmitting a cell selection instruction to the first UE, wherein the cell selection instruction directs the first UE to attach to the second extraterrestrial base station;

predicting that at least one of the one or more metrics associated with the first coverage area will exceed the predetermined threshold at a future time; and transmitting a future cell selection instruction to a second UE, wherein the future cell selection instruction directs the second UE to attach to the second extraterrestrial base station at the future time.

2. The system of claim 1, wherein the one or more metrics comprise at least one of: signal strength, data transfer rates, connection latency, packet loss rates, signal to interference and noise ratio (SINR), reference signal receive power (RSRP), reference signal received quality (RSRQ), receive signal strength indicator (RSSI), channel quality indicator, and block error rate.

3. The system of claim 1, wherein the determining that the first UE is located within the overlapping coverage area comprises receiving an indication from the first UE that the first UE is receiving synchronization signals from both the first extraterrestrial base station and second extraterrestrial base station.

4. The system of claim 1, further comprising an optimization algorithm configured to determine future coverage areas for the first extraterrestrial base station and the second extraterrestrial base station based on predicted locations and metric levels.

5. The system of claim 4, wherein the optimization algorithm further incorporates signal conditions, traffic predictions, and loading conditions.

6. The system of claim 1, wherein the determination that at least one of the one or more metrics associated with the first coverage area exceeds a predetermined threshold is based in part on a surge in a strength or number of uplink signals from a specific region within the first coverage area.

7. A method for dynamic optimization of extraterrestrial base station coverage areas comprising:

receiving, at a first extraterrestrial base station, one or more metrics associated with a first coverage area;

determining, based on the one or more metrics, that a load level for the first coverage area exceeds a predetermined threshold;

identifying a user equipment (UE) located within an overlapping coverage area between the first extraterrestrial base station and a second extraterrestrial base station;

transmitting a cell selection instruction to the UE, wherein the cell selection instruction directs the UE to attach to the second extraterrestrial base station; and determining one or more future overloading events based on past and current data on traffic patterns, connection requests, data packet volumes, and signal strengths.

8. The method of claim 7, wherein the one or more metrics comprise at least one of: signal strength, data transfer rates, connection latency, packet loss rates, signal to interference and noise ratio (SINR), reference signal receive power (RSRP), reference signal received quality (RSRQ), receive signal strength indicator (RSSI), channel quality indicator, and block error rate.

9. The method of claim 7, further comprising determining a first optimized coverage area for the first extraterrestrial base station and a second optimized coverage area for the second extraterrestrial base station, wherein the second optimized coverage area is configured to provide downlink signals to the UE.

10. The method of claim 9, further comprising adjusting beams or coverage areas of the first extraterrestrial base station to match the determined first optimized coverage area.

11. The method of claim 10, wherein adjusting the beams or coverage areas of the first extraterrestrial base station uses a phased array antenna system.

12. The method of claim 7, further comprising determining that the UE is located within the overlapping coverage area based on received signal reports from the UE.

* * * * *